(12) United States Patent
Shellhause et al.

(10) Patent No.: US 10,704,765 B2
(45) Date of Patent: Jul. 7, 2020

(54) COMPOSITE OPTICAL ELEMENT

(71) Applicant: HONEYWELL INTERNATIONAL INC., Morris Plains, NJ (US)

(72) Inventors: Daniel Shellhause, South Vienna, OH (US); Bo Stout, Springfield, OH (US); Newel Stephens, Springfield, OH (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 116 days.

(21) Appl. No.: 15/966,681

(22) Filed: Apr. 30, 2018

(65) Prior Publication Data

US 2019/0331316 A1 Oct. 31, 2019

(51) Int. Cl.
*F21V 5/04* (2006.01)
*F21V 5/00* (2018.01)
*B64D 47/04* (2006.01)
*B29D 11/00* (2006.01)
*B29K 83/00* (2006.01)
*F21W 107/30* (2018.01)
*B29K 69/00* (2006.01)

(52) U.S. Cl.
CPC ........ *F21V 5/045* (2013.01); *B29D 11/00009* (2013.01); *B64D 47/04* (2013.01); *F21V 5/007* (2013.01); *B29K 2069/00* (2013.01); *B29K 2083/005* (2013.01); *F21W 2107/30* (2018.01)

(58) Field of Classification Search
None
See application file for complete search history.

(56) References Cited

U.S. PATENT DOCUMENTS

| 7,081,644 | B2 | 7/2006 | Flaherty et al. | |
|---|---|---|---|---|
| 2011/0157891 | A1* | 6/2011 | Davis | B29C 45/14467 362/244 |
| 2014/0268761 | A1* | 9/2014 | Raleigh | F21V 5/04 362/244 |
| 2014/0268762 | A1* | 9/2014 | Raleigh | F21V 5/04 362/244 |
| 2014/0268810 | A1* | 9/2014 | Marquardt | F21V 5/04 362/308 |
| 2015/0241021 | A1 | 8/2015 | Wilcox et al. | |

* cited by examiner

*Primary Examiner* — Elmito Breval
(74) *Attorney, Agent, or Firm* — Lorenz & Kopf, LLP

(57) ABSTRACT

Systems and methods are provided for forming a composite optical element having a transparent lens carrier and a lens attached to the transparent lens carrier. The lens is formed from liquid silicone rubber. The Young's modulus of the material of the lens carrier is higher than that of liquid silicone rubber. The lens carrier includes a plurality of surface features configured to interface with the transparent lens.

18 Claims, 17 Drawing Sheets

COMPOSITE OPTICAL ELEMENT

TECHNICAL FIELD

The present disclosure generally relates to the field of lighting systems. More particularly, the present disclosure relates to composite optical elements for use in vehicle lighting systems.

BACKGROUND

Lighting systems, such as lighting systems for aircraft, are known. Lighting systems are generally required on aircraft for use as landing lights, taxi lights, search lights and so on. These lighting systems are used, for example, to better illuminate the runway during take-off and landing under low-light conditions.

A lighting system incorporates a light source. For certain applications, the light emitted from a light source must be directed in a particular manner, for example to control the spread and orientation of the emitted light. In order to properly direct the light emitted from the light source, a lens is used.

The spatial and optical parameters of the lens used to control the output light are of the upmost importance. As such, the lens may be formed from a material that has been selected to have advantageous optical and formability properties. One example of a material that may be used to form a lens is liquid silicone rubber (LSR).

In particular, liquid silicone rubber (LSR) has good optical properties and good formability properties, thereby allowing for the formation of complex lens shapes. Liquid silicone rubber also weighs less than some other materials that may be used to form lenses, such as glass, and may therefore be preferred in certain applications for this reason. However, despite the advantageous optical and formability properties associated with liquid silicone rubber, liquid silicone rubber also has some disadvantageous properties. For example, some forms of liquid silicone rubber may have a relatively lower Young's modulus (less than 0.05 GPa) and lower hardness rating (around 5 to 90 on the Shore A hardness scale) compared to other optical materials such as Poly(methyl methacrylate) (PMMA), which may have a Young's modulus of around 1.8 to 3.1 GPa and a hardness rating of around 90 to 100 on the Shore D hardness scale or Polycarbonate, which may have a Young's modulus of around 13.5 to 21.4 GPa and a hardness of around 80 on the Shore D hardness scale.

These relatively poorer structural properties of liquid silicone rubber means that it can be difficult, during assembly of a lighting system, to accurately position the liquid silicone rubber lens in a desired position relative to the light source. Furthermore, if the lighting system including the liquid silicone rubber lens is incorporated into a vehicle such as an aircraft, vibration caused by the vehicle's motion may displace or otherwise distort the liquid silicone rubber lens relative to the light source, thereby reducing the optical performance of the lighting system.

It would therefore be desirable to improve the structural properties of lenses formed from liquid silicone rubber.

BRIEF SUMMARY

This summary is provided to introduce a selection of concepts in a simplified form that are further described below in the detailed description section.

In an exemplary embodiment, there is provided a composite optical element for use in a vehicle lighting system. The composite optical element includes a transparent lens carrier formed from a first material. The composite optical element also includes a lens attached to the transparent lens carrier. The lens is formed from liquid silicone rubber. The Young's modulus of the first material of the transparent lens carrier is higher than the Young's modulus of the material of the lens. The transparent lens carrier comprises a plurality of surface features configured to interface with the lens.

In another exemplary embodiment, there is provided a lighting system. The lighting system includes one or more light sources. The lighting system also includes a composite optical element. The composite optical element includes a transparent lens carrier formed from a first material. The composite optical element also includes a lens attached to the transparent lens carrier. The lens is formed from liquid silicone rubber, and the Young's modulus of the first material of the transparent lens carrier is higher than the Young's modulus of the lens. The transparent lens carrier comprises a plurality of surface features configured to interface with the lens.

In another exemplary embodiment, there is provided a method of forming a composite optical element for use in a vehicle lighting system. The method includes forming a transparent lens carrier from a first material having a first Young's modulus. The method further includes forming a plurality of surface features on a surface of the transparent lens carrier. The method further includes forming a lens around the plurality of surface features using liquid silicone rubber, the liquid silicone rubber having a second Young's modulus lower than the first Young's modulus of the first material.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. Furthermore, there is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
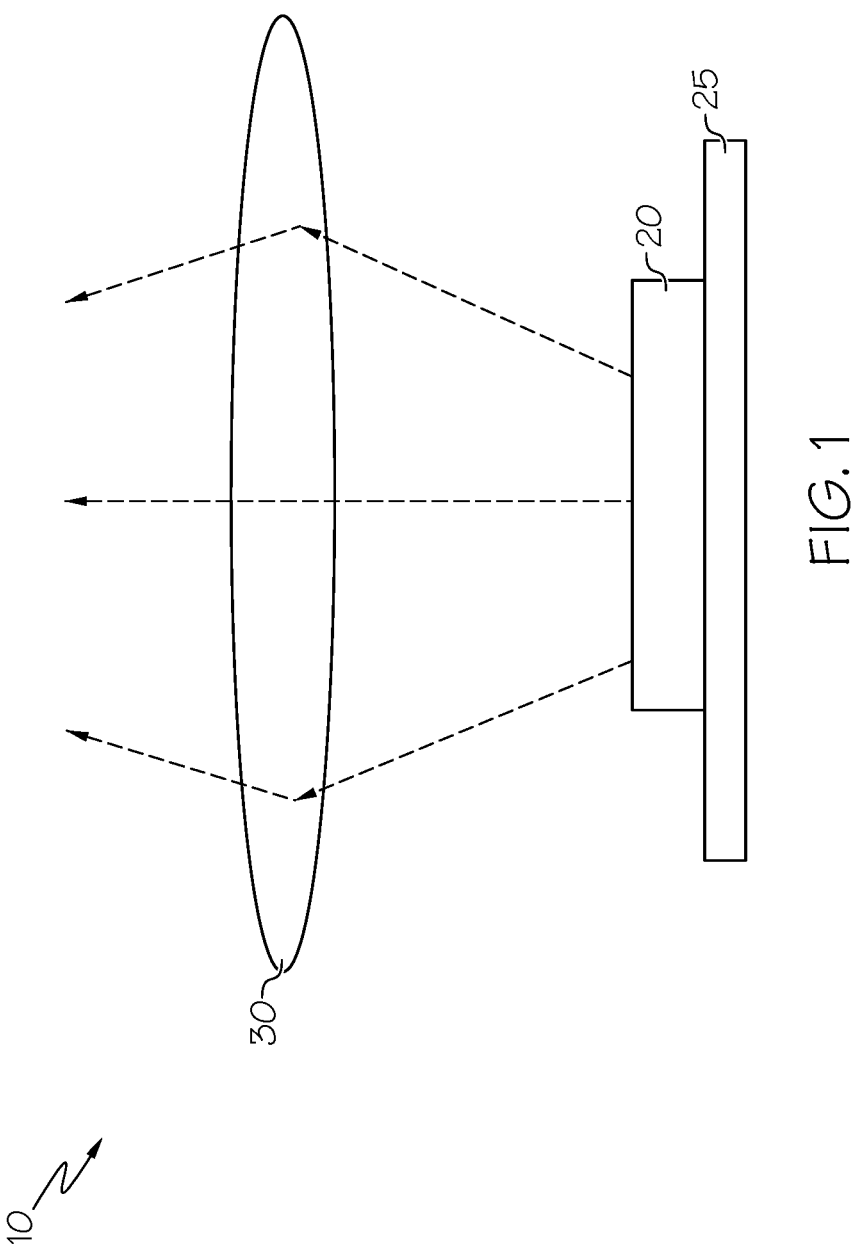
FIG. 1 shows a schematic of a lighting system having a liquid silicone rubber lens.

FIG. 1 shows a lighting system 10 including a light source 20 and a lens 30. In an embodiment, the light source 20 is electrically connected to a substrate 25. In an embodiment, the substrate 25 is electrically conductive, and electrical energy provided from a power source (not shown) is supplied to the light source 20. The light source 20 converts the electrical energy into light. The light (shown in this figure with dashed arrows) output by the light source 20 is incident upon the lens 30 and is subsequently directed by the lens 30. For example, in various embodiments, the lens 30 includes optical features (not shown in this figure) that are formed as simple concave or convex lenses.

As explained above, one preferred material used for forming the lens is liquid silicone rubber (LSR), which has good optical properties and good formability, thereby allowing for the formation of complex lens shapes. Liquid silicone rubber also weighs less than some other materials that may be used to form lenses, such as glass. Examples of liquid silicone rubber that may be used for forming optical lenses include Silopren™.

In order to compensate for the previously described disadvantageous structural properties of liquid silicone rubber, such as a lower Young's modulus value and/or lower hardness value, embodiments disclosed herein incorporate a transparent rigid lens carrier attached to the liquid silicone rubber lens. As used herein, a "composite optical element" defines the combination of a rigid lens carrier and the liquid silicone rubber lens. The use of a composite optical element allows for the retention of the advantageous optical and formability properties of liquid silicone rubber, whilst also improving the structural properties of liquid silicone rubber. Furthermore, the use of a lens carrier may also aid in protecting the lens from abrasive particles or other particulate matter.

Figure 2:
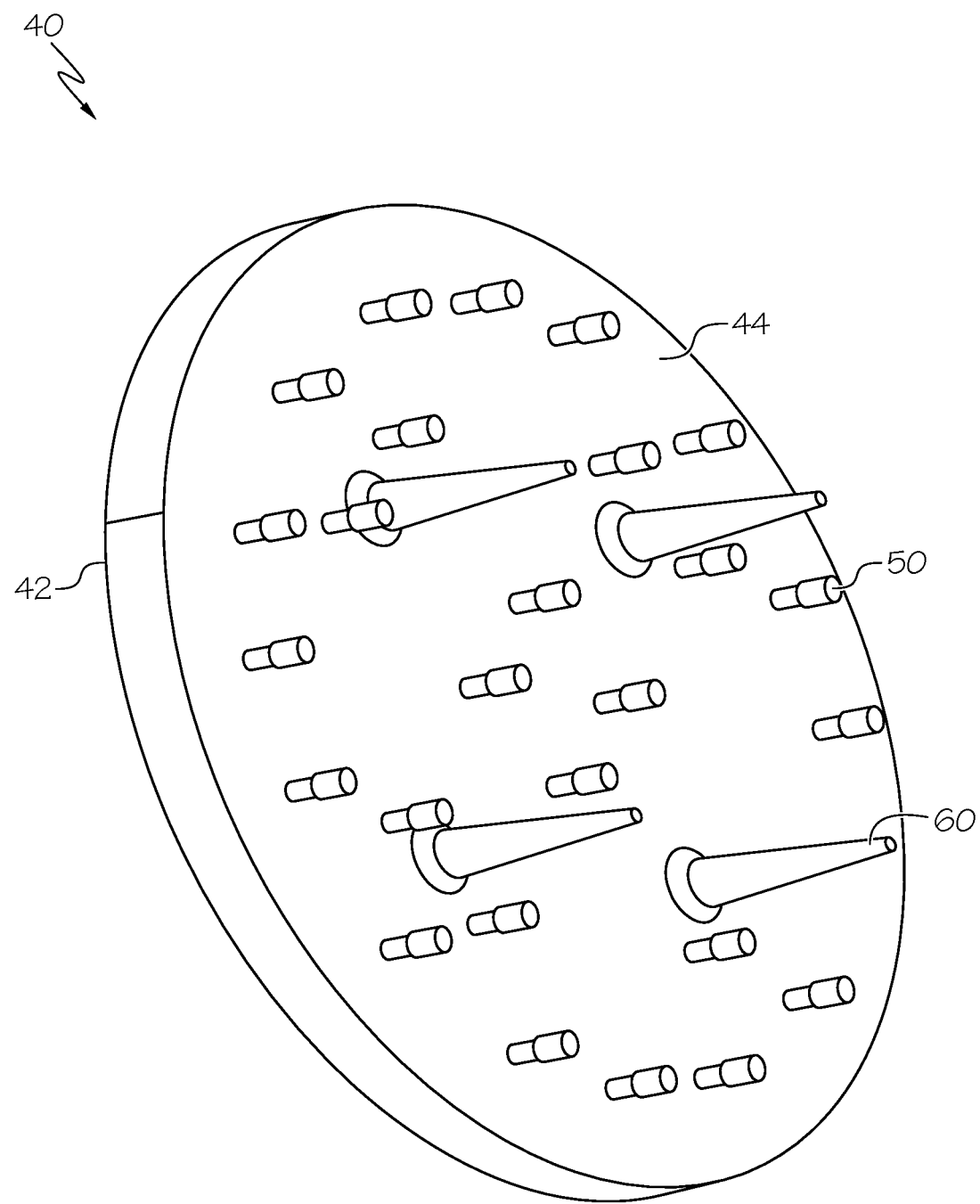
FIG. 2 shows a lens carrier in accordance with various embodiments.

A transparent lens carrier 40 according to an embodiment is shown in FIG. 2. The transparent rigid lens carrier 40 is made from an optically transparent material having relatively better structural properties as compared to liquid silicone rubber. For example, the material of the rigid lens carrier may have a higher Young's modulus and/or a higher hardness scale rating than liquid silicone rubber. In an embodiment, the rigid lens carrier is formed from glass or from a transparent plastic, for example Polycarbonate or Poly(methyl methacrylate) (PMMA). The transparent lens carrier 40 has a first surface 42 and a second surface 44 opposite to the first surface 42. The second surface 44 includes surface features 50, 60. The surface features include at least one capture feature 50 or at least one locating feature 60. In an embodiment, the second surface 44 includes both of at least one capture feature 50 and at least one locating feature 60.

Figure 3:
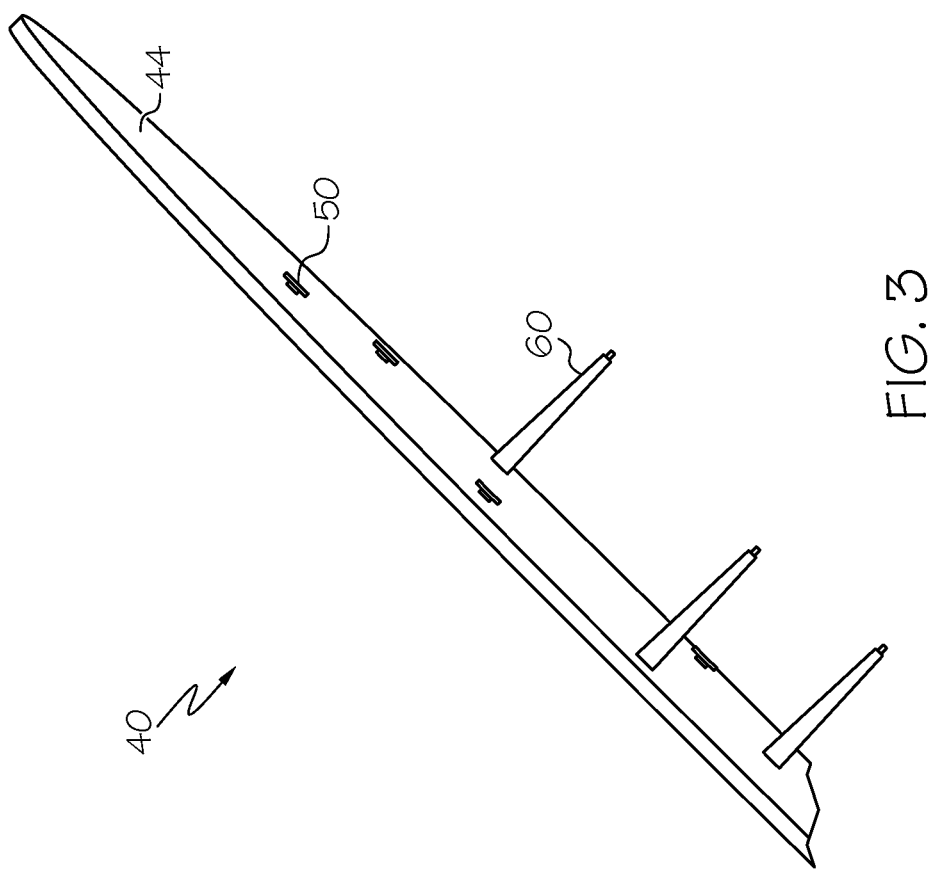
FIG. 3 shows another view of a lens carrier in accordance with various embodiments.

FIG. 3 shows another view of a transparent lens carrier 40. As can be seen in FIG. 3, the locating features are configured to protrude a further distance away from the second surface 44 as compared to the capture features 50. The different protrusion lengths from the second surface 44 is due to the different functionality of the capture features 50 and the locating features 60.

In particular, as will be explained in more detail below, the locating features 60 are configured to position a liquid silicone rubber lens in a fixed location relative to the lens carrier 40, and may also be used to attach the composite optical element to another component of the lighting system 10. In particular, the locating features 60 may be used to index a liquid silicone rubber lens to the lens carrier 40. As will also be explained in more detail below, the capture features 50 are embedded within the liquid silicone rubber lens in order to securely attach the liquid silicone rubber lens to the rigid lens carrier.

Figure 4:
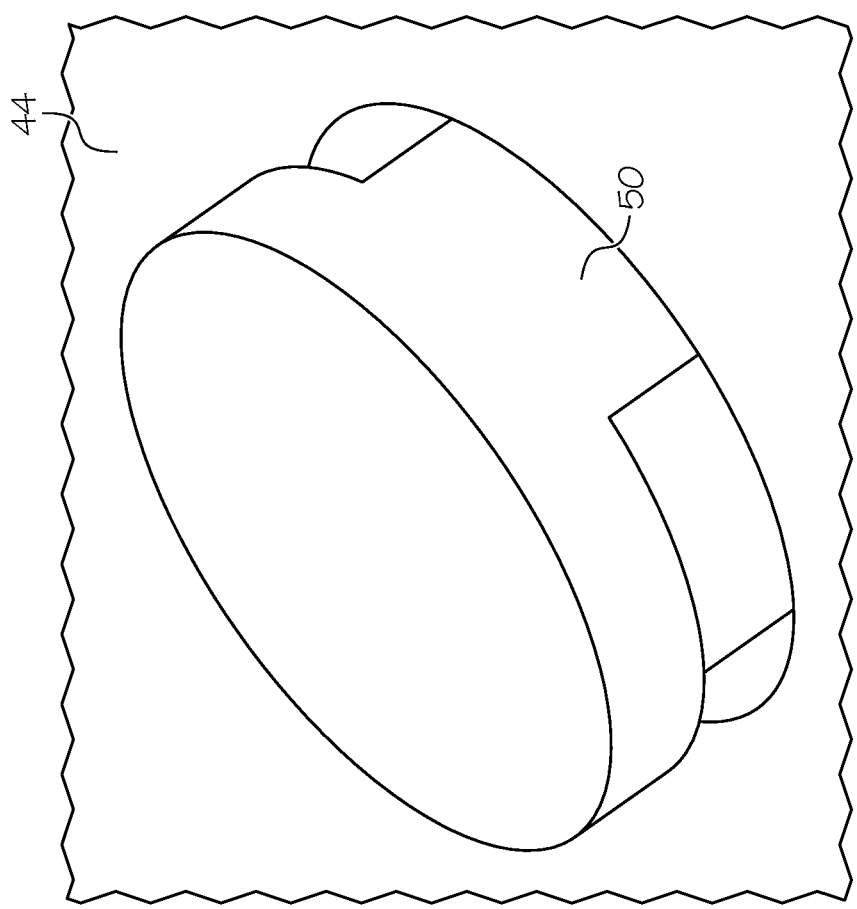
FIG. 4 shows a front view of a capture feature of a lens carrier in accordance with various embodiments.
Figure 5:
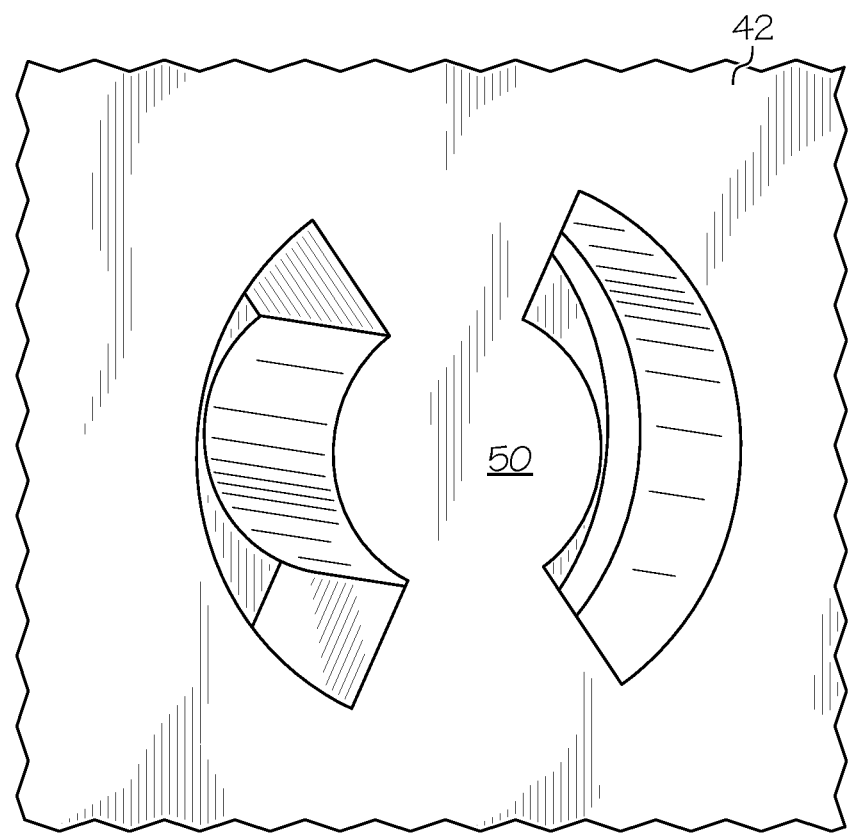
FIG. 5 shows a back view of a capture feature of a lens carrier in accordance with various embodiments.

A front view of an individual capture feature 50 protruding from the second surface 44 is shown in FIG. 4. A corresponding back view of an individual capture feature 50 being recessed in the first surface 42 is shown in FIG. 5. As can be seen in FIGS. 4 and 5, the capture feature 50 may be formed with a recessed structure and with simple geometrical shapes. Forming the capture feature 50 in this manner allows for production of the lens carrier 40 and capture feature 50 with less advanced injection molding tools, thereby simplifying production of the lens carrier 40.

Figure 6:
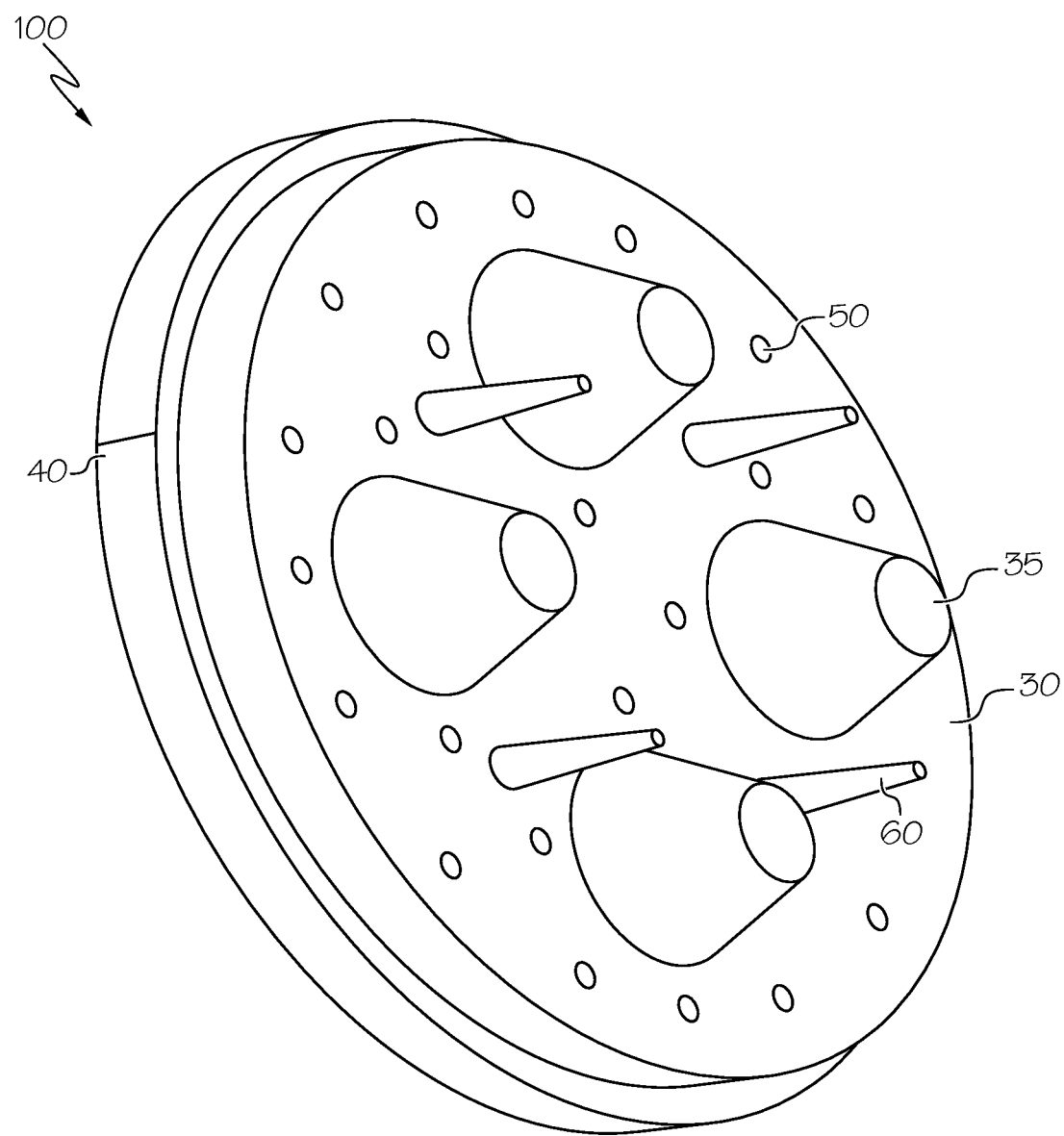
FIG. 6 shows a composite optical element in accordance with various embodiments.

A liquid silicone rubber lens 30 is shown attached to a rigid lens carrier 40 in FIG. 6. As used herein, the combination of a liquid silicone rubber lens 30 attached to a rigid lens carrier 40 will be defined as a composite optical device 100. As can be seen in FIG. 6, the capture features 50 of the transparent lens carrier 40 are embedded within the material of the liquid silicone rubber lens 30. By embedding the surface features 50 within the material of the liquid silicone rubber lens, a more secure and permanent attachment between the lens carrier 40 and the lens 30 may be formed as compared to other types of attachment, such as through the use of adhesive.

In an embodiment, the lens 30 includes one or more optical features 35 configured to direct light from one or more respective light sources (not shown) positioned proximate to the lens 30. The optical features may exhibit complicated structures, such as a Fresnel lens structure, or simpler structures, such as concave or convex lens shapes. In various embodiments, the light source 20 includes more than one light-emitting component. For example, in certain embodiments the light source 20 may include a plurality of LEDs, with each one of the LEDs emitting light that is directed by a respective optical feature 35. In an alternative embodiment, the whole of the lens 30 acts as a single optical feature to direct light emitted from the light source 20.

Figure 7:
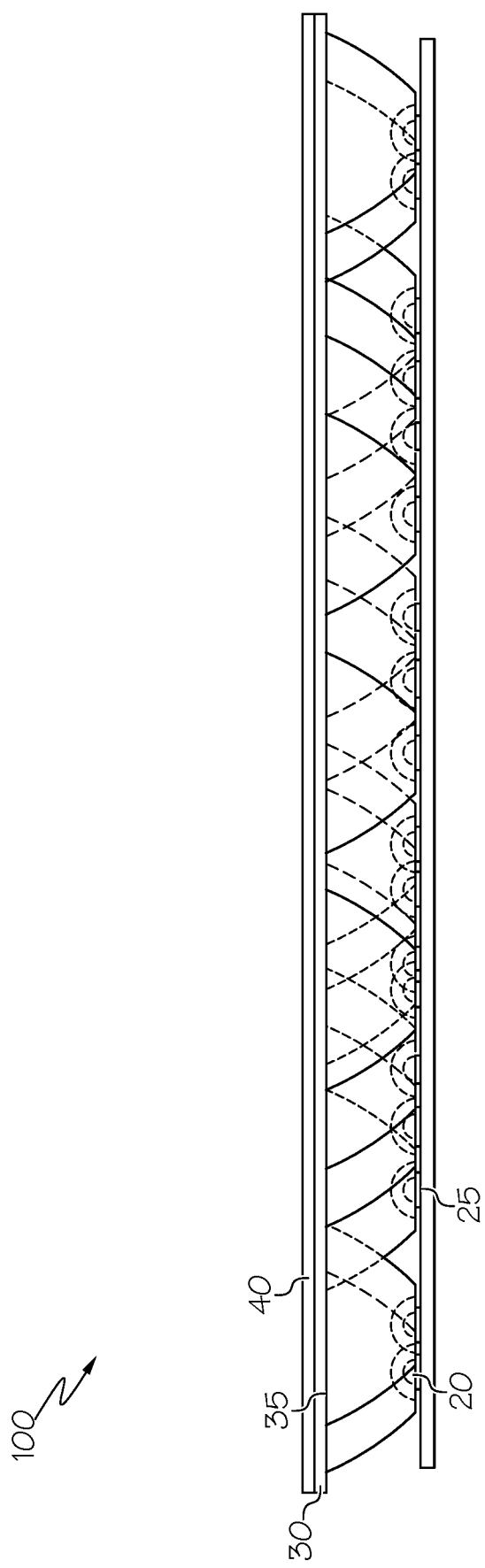
FIG. 7 shows another view of a composite optical element in accordance with various embodiments.
Figure 8:
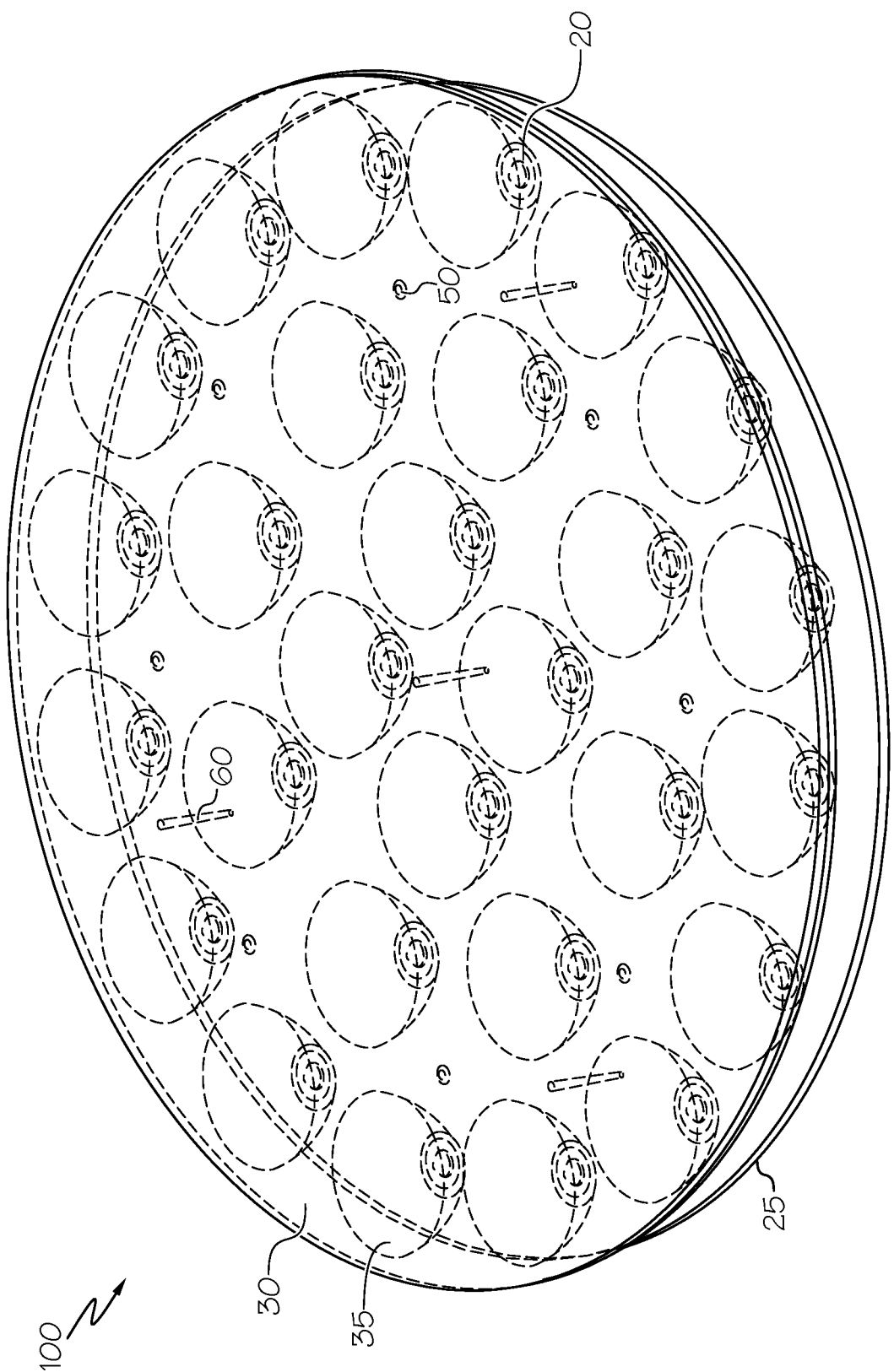
FIG. 8 shows another view of a composite optical element in accordance with various embodiments.

The positional arrangement between the light sources and the optical features 35 is shown in FIGS. 7 and 8. As can be seen in the embodiment of FIGS. 7 and 8, each respective light source 20 is positioned adjacent to an optical feature 35 of the lens 30. In an embodiment, each respective light source 20 partially protrudes into each respective optical feature 35. In an alternative embodiment, the light sources 20 do not protrude into the respective optical features 35. In an embodiment, the optical feature/s 35 directs the light emitted from the light source/s 20. As explained above, in an embodiment, the light sources 20 are connected to a substrate 25.

Figure 9:
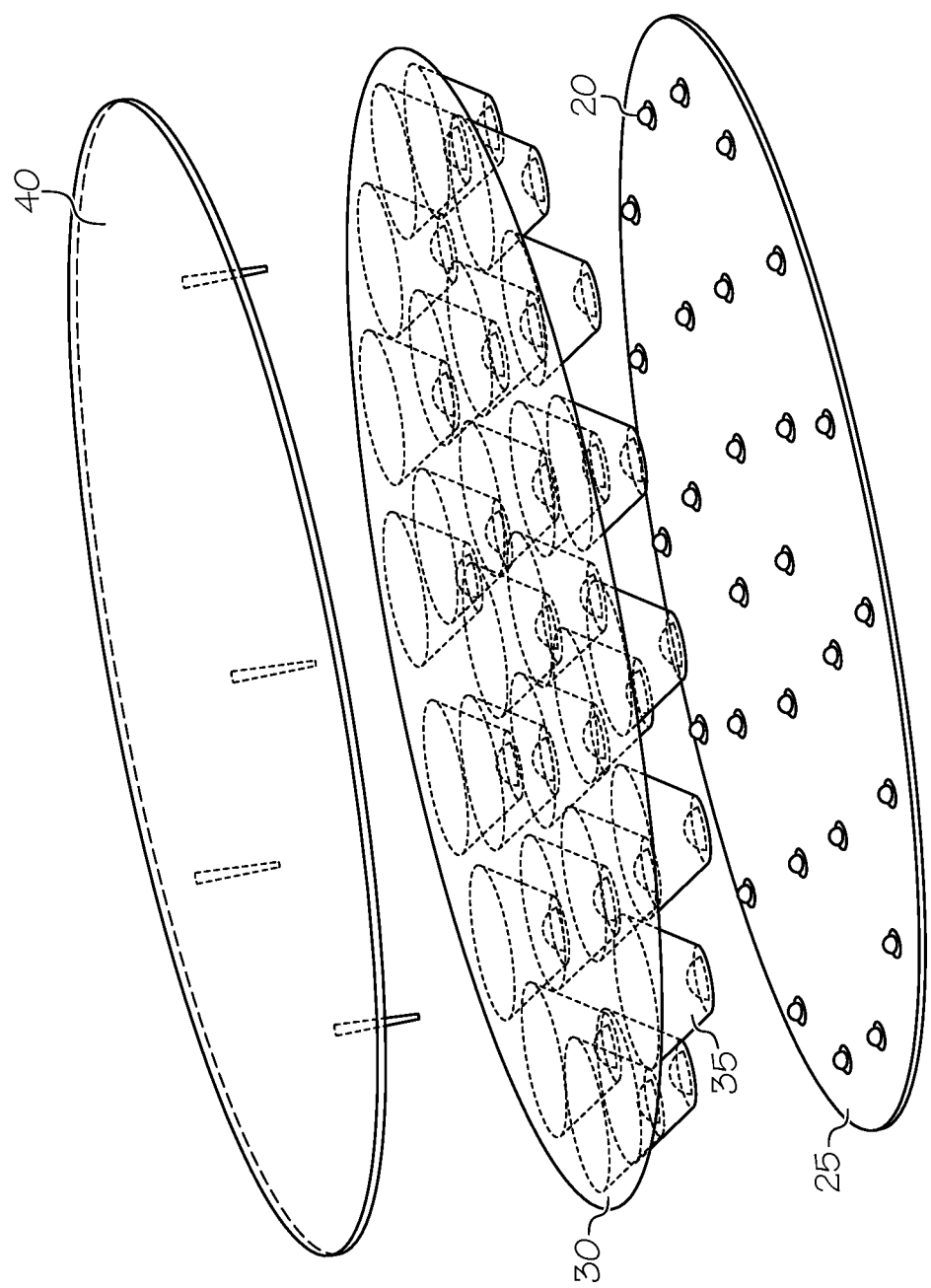
FIG. 9 shows an exploded view of a composite optical element in accordance with various embodiments.

FIG. 9 shows an exploded view of the embodiment of FIGS. 7 and 8. FIG. 9 also shows that the light sources 20 are positioned adjacent to the optical features 35 of the lens 30, when the lens 30 and the substrate 25 are assembled into a light housing (not shown).

As can also be seen in FIG. 8, the capture features 50 and the locating features 60 are positioned away from the optical features 35 in order to ensure that these capture features 50 and locating features 60 do not interfere with the optical function of the optical features 35. In other words, by positioning the capture features 50 attaching the lens 30 to the lens carrier 40 and the locating features 60 away from the optical features 35, less optical interference is caused as compared to a situation where a hypothetical further layer were to be interposed between the lens 30 and the lens carrier 40 (for example an adhesive layer). In other words, the introduction of another optical element (such as an adhesive layer) between the transparent rigid lens carrier 40 and the lens 30 may disadvantageously reduce the optical performance of the overall composite optical element 100, and the use of capture features 50 to attach the lens 30 to the transparent rigid lens carrier 40 avoids this disadvantage.

Figure 10:
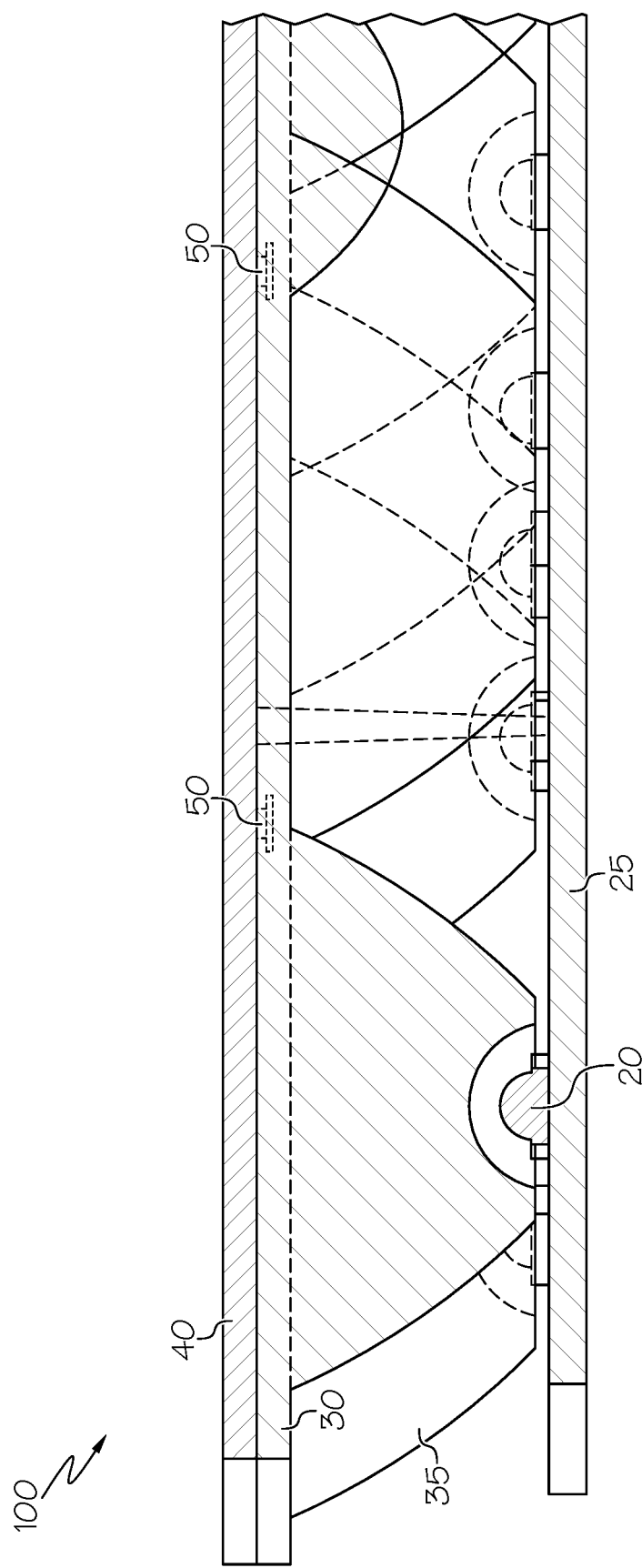
FIG. 10 shows a cross section of a composite optical element in accordance with various embodiments.

FIG. 10 shows a cross section of the composite optical element 100. As can be seen in the embodiment of FIG. 10, the light sources 20 are positioned adjacent to the optical features 35 of the lens 30. As can also be seen in the embodiment shown in FIG. 10, the capture features 50 are located away from the optical features 35, so as to reduce the likelihood that the capture features 50 optically interfere with the optical function of the optical features 35. Furthermore, as can also be seen in the embodiment shown in FIG. 10, the capture features 50 protrude only into the material of the lens 30, and do not extend through to the second surface of the lens 30 upon which surface the optical features 35 are disposed, thereby further reducing the likelihood of optical interference being caused by the capture features 50.

Another advantage associated with the capture features 50 is that, by using these capture features to attach the lens 30 to the lens carrier 40, the shape of the lens 30 is not particularly limited. In particular, the capture features 50 may be used to securely attach a lens 30 having even a contoured surface to the lens carrier 40, as compared to, for example, the use of an adhesive, where a substantially flat surface of the lens would be required to adhere the lens to the rigid lens carrier.

Figure 11:
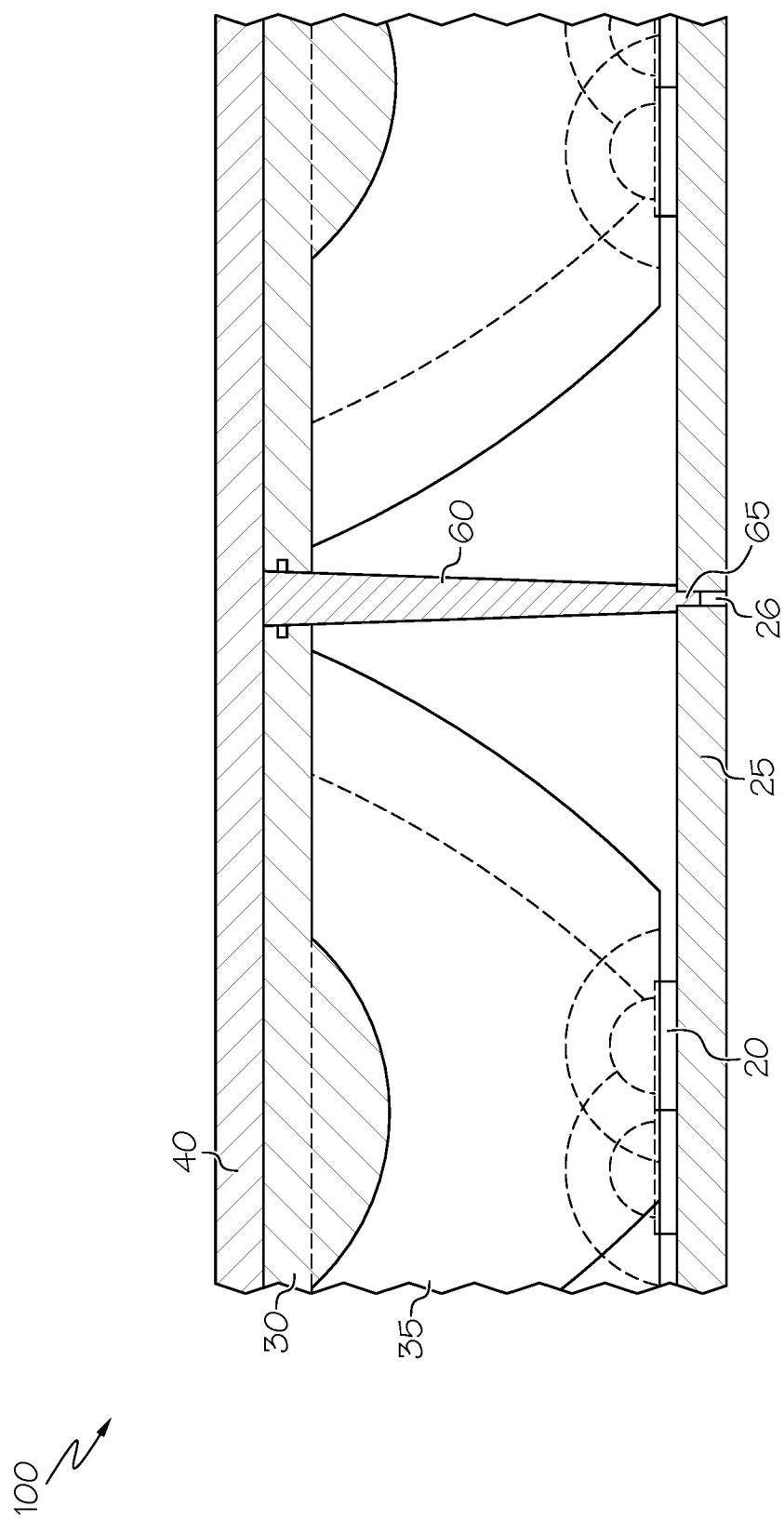
FIG. 11 shows another cross section of a composite optical element in accordance with various embodiments.

FIG. 11 shows a cross section of the composite optical element 100, with particular emphasis on a locating feature 60. As can be seen in the embodiment shown in FIG. 11, the locating feature 60 may extend entirely through the material of the lens 30. Furthermore, in various embodiments, an end 65 of the locating feature 60 is adapted to connect with the substrate 25 upon which the light sources 20 are supported, thereby attaching the composite optical element 100 to the substrate 25. In an embodiment, the end 65 is adapted to press-fit into a recess 26 of the substrate 25. The ends 65 of the locating features 60 may be adapted for connection with the substrate by, for example, pre-roughening the ends 65 through the use of etching, and then adhesively attaching the ends of the locating features 60 to a location on the structural supports 210. Additionally or alternatively, the ends 65 of the locating features 60 may be shaped so as to press-fit into corresponding recesses on the substrate 25.

As can also be seen in the embodiment of FIG. 11, the locating features 60 protruding through the lens 30 position the lens 30 in a pre-determined position relative to the substrate 25, thereby aiding alignment between the light sources 20 and the optical features 35. In addition to providing support for the lens 30, the locating features 60 may also aid in structurally supporting the lens 30. For example, the substrate 25 to which the locating features 60 are attached may act as a structural support for the lens. In particular, in various embodiments, the locating features 60 further reduce lateral movement of the lens 30 if the optical element 100 is subject to vibration, for example vibration from vehicle motion. IN alternative embodiments, the locating features 60 may connect to a dedicated structural support (not shown in this figure).

Figure 12:
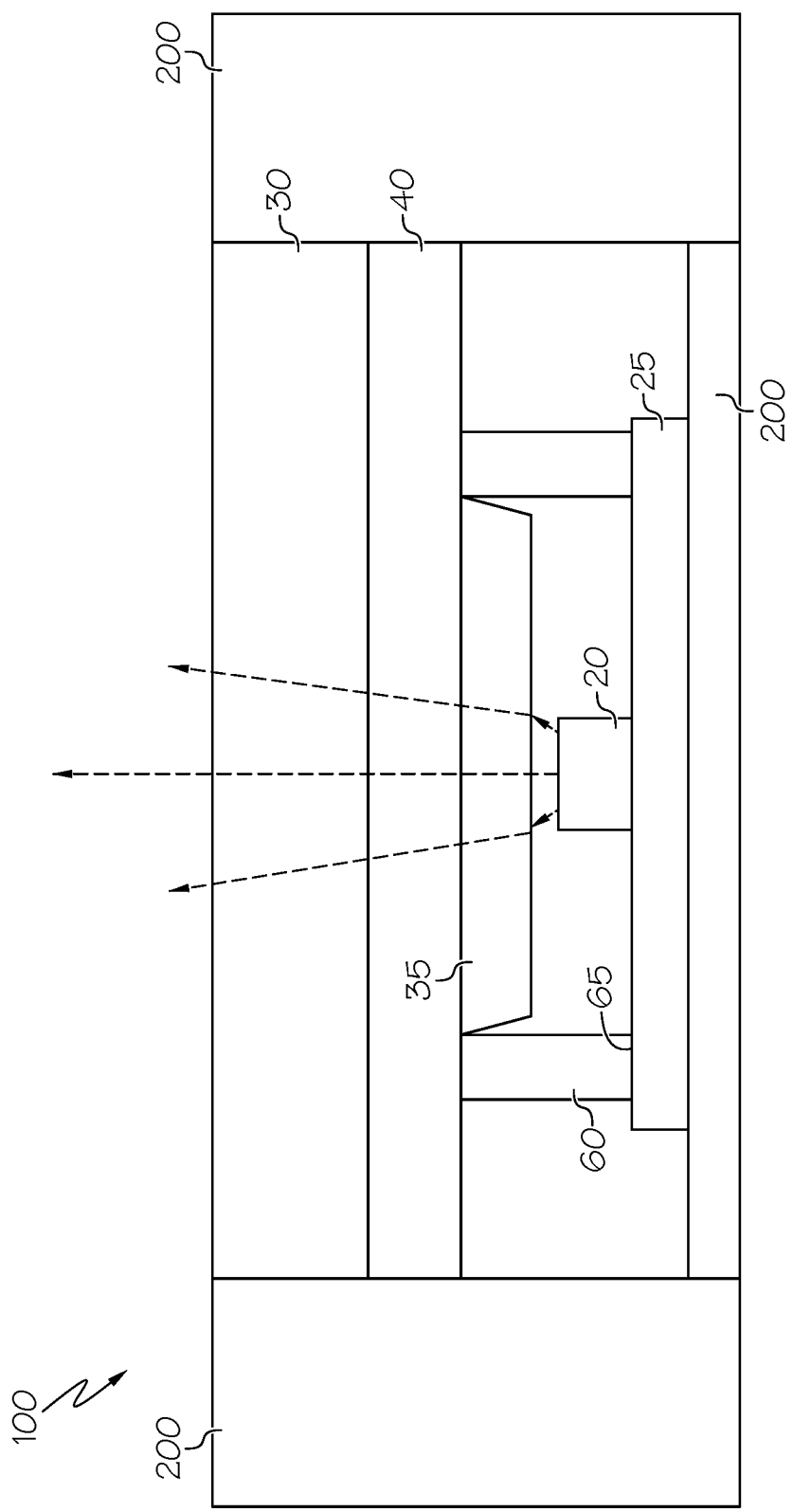
FIG. 12 shows a schematic of a lighting system in accordance with various embodiments.

As shown in the schematic of FIG. 12, in one embodiment, the composite optical element 100 and the substrate 25 with light sources 20 may be disposed inside a light housing 200. In an embodiment, the light housing 200 is integrated into a vehicle, such as an aircraft. As can be seen in the schematic of FIG. 12, the optical features 35 direct the light (shown here in dashed lines) emitted from the light sources positioned adjacent to the optical features. Furthermore, the light is transmitted through the transparent lens carrier 40.

Figure 13:
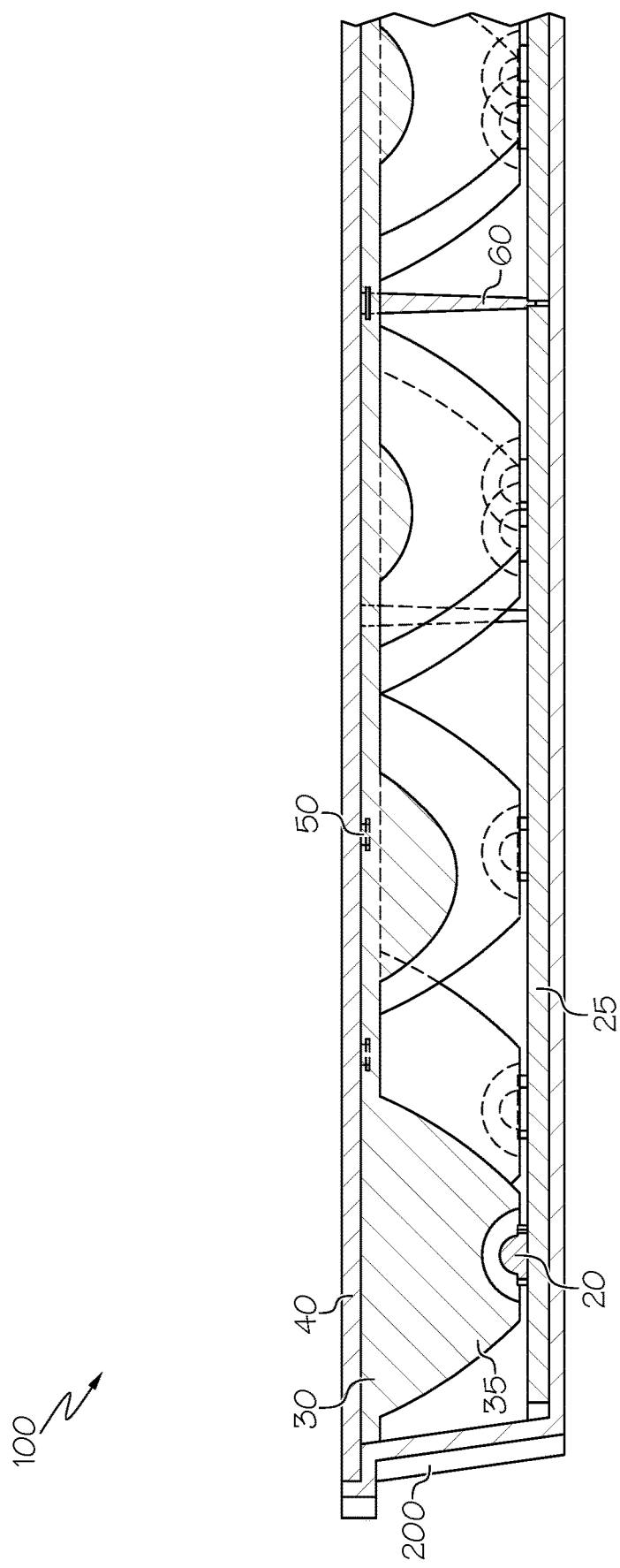
FIG. 13 shows a cross section of a lighting system in accordance with various embodiments.

Another, more detailed schematic of the composite optical element 100 and the substrate 25 being incorporated into a light housing 200 is shown in FIG. 13. As can be seen in FIG. 13, the light sources 20 may partially protrude into the respective optical elements 35, and the light emitted from the light sources 20 will be directed by the optical elements 35 and transmitted through the lens carrier 40.

Figure 14:
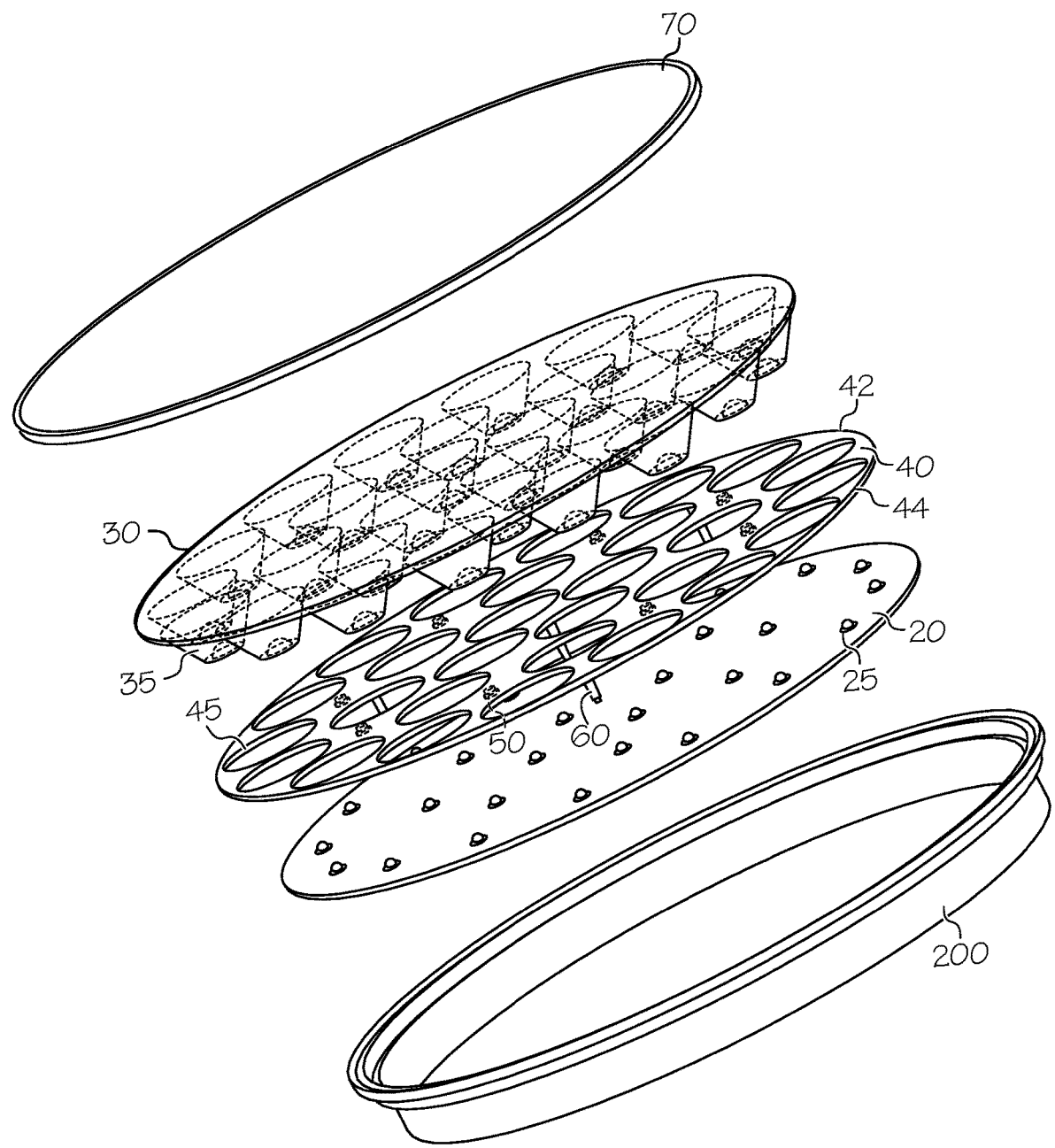
FIG. 14 shows an exploded view of a lighting system in accordance with various embodiments.

Turning to FIG. 14, an exploded view version of another embodiment of the composite optical element is shown. As can be seen in FIG. 14, in this alternative embodiment, the lens carrier 40 includes through-holes 45, through which through-holes 45 the optical features 35 of the lens 30 protrude. In the lens carrier 40 of this embodiment, the capture features 50 are located on the first surface 42 of the lens carrier 40, whereas the locating features 60 are still located on the second surface 44 of the lens carrier 40. When assembled, the lens 30 will be attached, via the capture features 50, to the first surface 42 of the lens carrier 40, and the optical features will protrude through the through-holes 45 in the lens carrier 40. By providing through-holes 45 in the lens carrier 40, the amount of optical interference caused by the lens carrier 40 is reduced, since the light directed by the optical features 35 will not have any extra reflections on or be absorbed by the material of the lens carrier 40.

As can also be seen in the embodiment shown in FIG. 14, a lens cover 70 is provided. The lens cover 70 reduces the likelihood of damage to the lens 30 by, for example, debris or other external agents.

Figure 15:
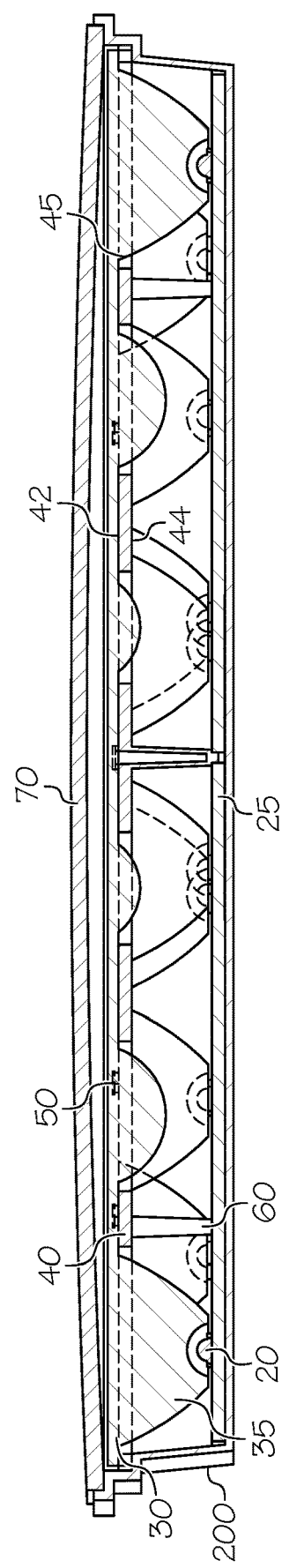
FIG. 15 shows a cross section of a lighting system in accordance with various embodiments.
Figure 16:
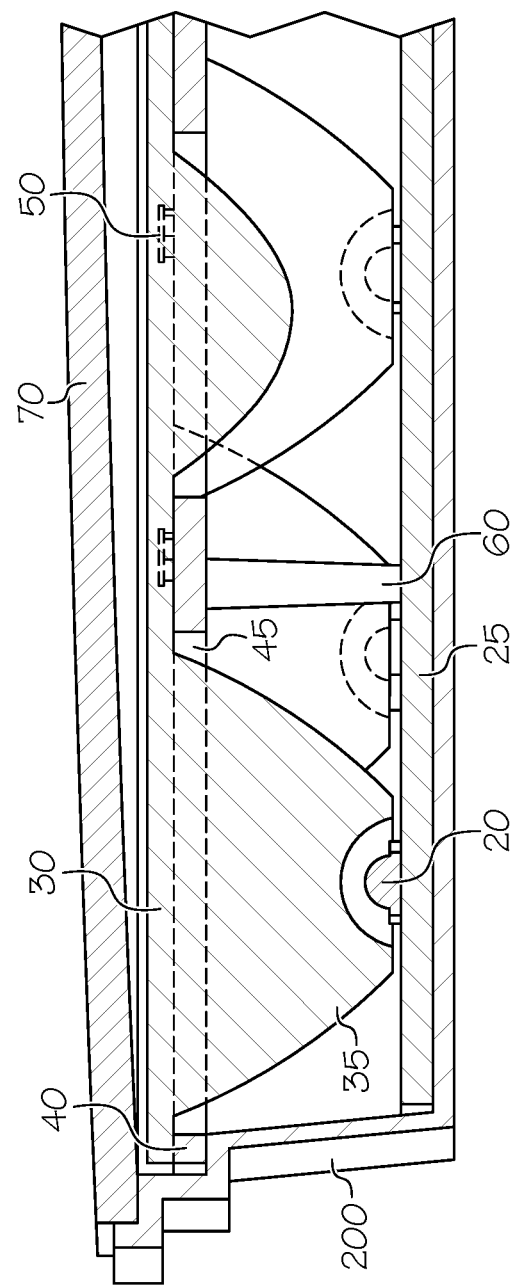
FIG. 16 shows another cross section of a lighting system in accordance with various embodiments.

A cross-sectional view of the embodiment shown in FIG. 14 is shown in FIGS. 15 and 16. As can be seen in these figures, the capture features 50 and the locating features 60 of the lens carrier 40 are located on different surfaces 42, 44, of the lens carrier, and the optical features 35 protrude through through-holes 45 of the lens carrier 40. Light emitted by the light sources 20 is directed by the optical features 35 but is not transmitted through the material of the lens carrier 40. The light may be transmitted through the lens cover 70, if a lens cover is present.

Figure 17:
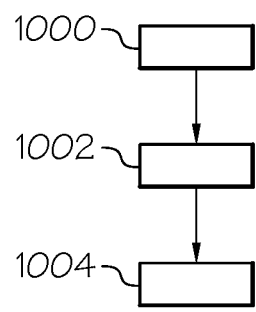
FIG. 17 shows a flowchart of a method of manufacturing a composite optical element in accordance with various embodiments.

FIG. 17 shows a flowchart for forming a composite optical device 100. At step 1000, a transparent lens carrier is formed. In one embodiment, the lens carrier is formed by molding, for example by molding a plastic, such as Polycarbonate. In an alternative embodiment, the lens carrier is formed by one of 3D printing, casting, or thermoforming.

At step 1002, a plurality of surface features are formed on a surface of the lens carrier. The surface features include capture features and/or locating features. In an embodiment, the surface features are formed by thermal or mechanical processing, for example by welding these surface features onto the lens carrier, by 3D-printing the surface features directly onto the lens carrier, or by machining the surface features into the lens carrier material. In an embodiment, the surface features are molded onto the lens carrier, such as by insert-molding or by two-shot molding. In an alternative embodiment, the surface features are formed integrally with the lens carrier, for example by molding the transparent lens carrier and the surface features as one piece, such that step 1002 is performed simultaneously with step 1000.

At step 1004, a lens is formed onto the lens carrier around the surface features of the lens carrier. The lens may be formed by two-shot molding, or by over-molding the lens onto the transparent lens carrier. In an embodiment, the lens includes one or more optical features configured to direct light from one or more respective light sources in a predetermined manner. In the molding step, liquid silicone rubber is molded onto the lens carrier. During the process of molding the lens onto the lens carrier, surface features of the lens carrier are encapsulated in the liquid silicone rubber, thereby fixedly attaching the lens onto the lens carrier to form a composite optical device. In one embodiment, the surface features include capture features which are wholly encapsulated within the liquid silicone rubber. Additionally or alternatively, the surface features include locating features that protrude through the liquid silicone rubber lens after the liquid silicone rubber lens has been molded onto the lens carrier.

In an embodiment, steps 1000 and 1004 may occur consecutively, for example by using a two-shot molding machine. In an alternative embodiment, steps 1000 to 1004 may be performed over a longer time period, for example by first forming a lens carrier, subsequently forming surface features onto the lens carrier, and then overmolding a liquid silicone rubber lens onto the lens carrier. In an embodiment, the lens is overmolded onto the lens carrier, and the locating features on the surface of the lens carrier act as a guide for the overmolding process.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A composite optical element for use in a vehicle lighting system, comprising:
   a transparent lens carrier formed from a first material having a first Young's modulus; and
   a lens attached to the transparent lens carrier, the lens being formed from liquid silicone rubber and having a second Young's modulus less than the first Young's modulus, wherein the transparent lens carrier comprises a plurality of surface features configured to interface with the lens, the surface features comprising capture features embedded within the lens.

2. The composite optical element of claim 1, wherein the surface features further comprise locating features, and wherein ends of the locating features are configured to attach to a structural support.

3. The composite optical element of claim 1, wherein the first material is Polycarbonate.

4. The composite optical element of claim 1, wherein the lens comprises a plurality of optical features, each optical feature being configured to direct light from a respective light source.

5. The composite optical element of claim 4, wherein the lens carrier comprises a plurality of through-holes, and wherein each one of the plurality of optical features is arranged to protrude through a respective through-hole.

6. A lighting system, the lighting system including:
   at least one light source; and
   a composite optical element comprising:
      a transparent lens carrier formed from a first material having a first Young's modulus; and
      a lens attached to the transparent lens carrier, the lens being formed from liquid silicone rubber and having a second Young's modulus less than the first Young's modulus, wherein the transparent lens carrier comprises a plurality of surface features configured to interface with the lens, the surface features comprising capture features embedded within the lens.

7. The lighting system of claim 6, wherein the surface features further comprise locating features, and wherein ends of the locating features are configured to attach to a structural support.

8. The lighting system of claim 6, wherein the first material is Polycarbonate.

9. The lighting system of claim 6, wherein the at least one light source comprises a plurality of light sources, and the lens comprises a plurality of optical features, each optical feature being configured to direct light from a respective light source of the plurality of light sources.

10. The lighting system of claim 9, wherein the lens carrier comprises a plurality of through-holes, and wherein each one of the plurality of optical features is arranged to protrude through a respective through-hole.

11. A method of forming a composite optical element for use in a vehicle lighting system, the method comprising:
   forming a transparent lens carrier from a first material having a first Young's modulus,
   forming a plurality of surface features on a surface of the transparent lens carrier, the surface features comprising capture features; and
   forming a lens around the plurality of surface features using liquid silicone rubber, such that the capture features are embedded within the lens, the liquid silicone rubber having a second Young's modulus lower than the first Young's modulus of the first material.

12. The method of claim 11, wherein the first material is Polycarbonate.

13. The method of claim 11, wherein the step of forming the transparent lens carrier comprises molding the transparent lens carrier.

14. The method of claim 11, wherein the step of forming the lens comprises over-molding the lens onto the transparent lens carrier.

15. The method of claim 11, wherein the step of forming the lens comprises co-molding the lens with the transparent lens carrier.

16. The method of claim 11, wherein the transparent lens carrier and the plurality of surface features are molded simultaneously as one piece.

17. The method of claim 11, wherein the lens comprises a plurality of optical features, each optical feature being configured to direct light from a respective light source.

18. The method of claim 11, wherein the lens carrier comprises a plurality of through-holes through which the plurality of optical features protrude.

* * * * *